3,591,401
FLOCKED, FOAMED, EMBOSSED SURFACE COVERING
Robert W. Snyder, Lancaster, and Daniel M. Sigman, Jr., Strasburg, Pa., assignors to Armstrong Cork Company, Lancaster, Pa.
Filed Mar. 11, 1969, Ser. No. 806,082
Int. Cl. B32b 5/32; B44c 1/08; D06n 3/08
U.S. Cl. 117—9         8 Claims

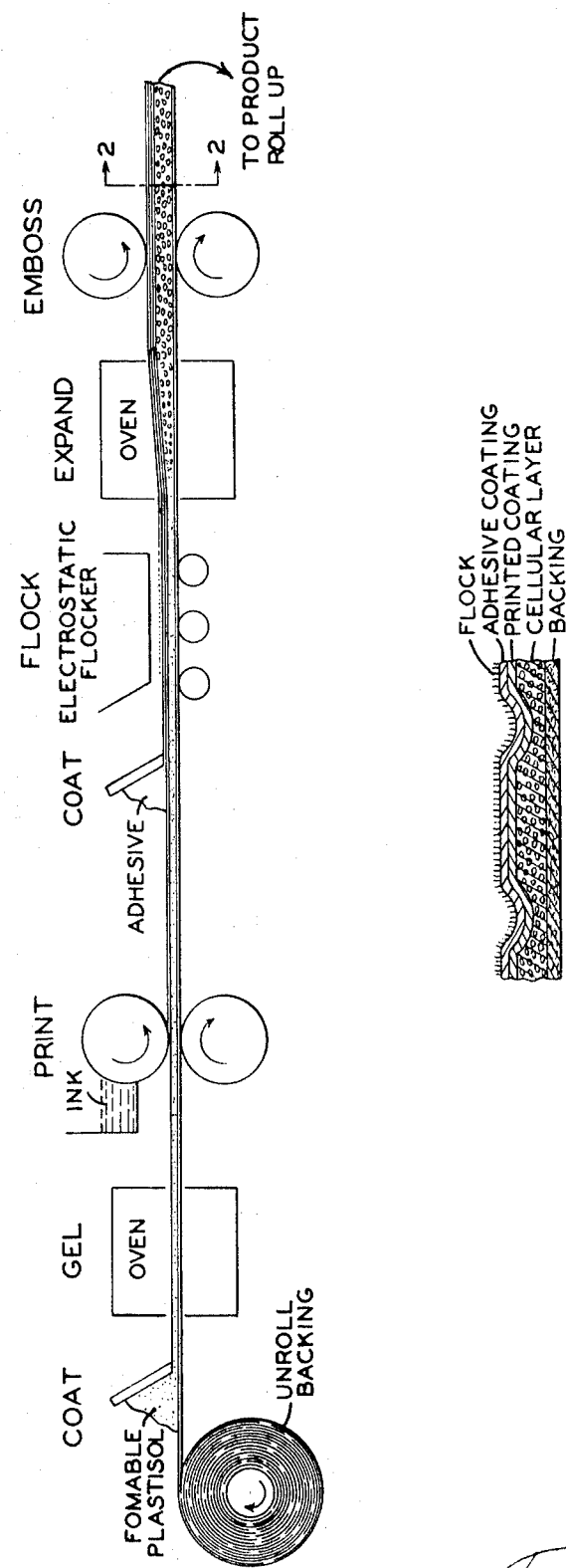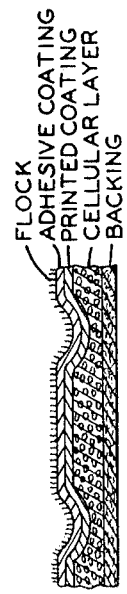

ABSTRACT OF THE DISCLOSURE

A surface covering for floors, walls, and the like. The product is made by forming a gelled, foamable but unfoamed plastisol sheet preferably of a vinyl resin and a plasticizer therefor, and containing the blowing agent, stabilizers, and other conventional ingredients. A decorative coating is applied, preferably by printing, to the surface of the gelled, foamable plastisol sheet. A transparent adhesive layer, preferably of a vinyl resin, is applied to the gelled, foamable plastisol layer on top of the printed decorative coating. Flock is then applied, the flock adhering to the sheet by means of the transparent adhesive layer. The system is then heated to fuse and expand the plastisol layer to form a foamed layer. The foamed layer carrying the flock is then mechanically embossed in any desired pattern, but preferably in a pattern to simulate a textile carpet, the embossing being sufficiently deep to create permanent impressions in the foamed layer itself. The embossing step enhances the appearance of the printed decorated coating.

BACKGROUND OF THE INVENTION

Field of the invention

The surface covering of the present invention will serve primarily as floor coverings. The products will be of lesser interest as wall coverings since their structure is designed primarily to withstand the hard, stringent use to which a floor covering is subjected.

Description of the prior art

The product and process of the present invention combines prior methods of forming foamed, fused plastisols in the form of sheets with prior flocking methods, plus some additional features. Mechanically embossed foamed floor coverings are described in U.S. 3,196,030—Petry. Chemically embossed foam floor coverings are described in U.S. 3,365,353—Witman, and others. The mechanical flocking of textile fabrics is described in U.S. 2,533,985—Aronstein et al. The present process and product presents a surface covering in which the visible, decorative layer is beneath the flocked layer and thus protected by the flock, and which simulates as to appearance, texture, and softness underfoot an actual textile carpet while maintaining the many soil-free advantages of a vinyl floor covering.

SUMMARY OF THE INVENTION

The product of the invention comprises a foamed, vinyl resin system in sheet form which may or may not be adhered to a conventional floor covering backing. A decorative coating overlays the foam layer, and a clear adhesive layer overlays the decorative coating. Suitable flock is adhered to the system by the adhesive layer. The product is embossed to impart decorative or any desirable surface contours to the sheet, the embossing extending down into the fused, foamed plastisol system itself. The decorative coating only becomes visible to the eye from any direction after the embossing step has been carried out. The finished product is soft underfoot and has the appearance of a tufted carpet, if such is desired. It also has the advantage of having the decorative coating positioned underneath the floor layer such that the layer of flock serves to protect the decorative coating from wear.

BRIEF DESCRIPTION OF THE DRAWING

FIG. 1 is a schematic representation of a process of making the surface covering of the present invention, and
FIG. 2 is a cross-sectional view of the product made in FIG. 1 taken on lines 2—2.
Legends are self-explanatory.

DESCRIPTION OF THE PREFERRED EMBODIMENTS

The surface covering of the present invention may be made on any of the conventional backings used in the floor covering industry. Most commonly these backings are beater saturated or after-saturated felts made of cellulosic or asbestos fibers. However, the backing may be of scrap vinyl, jute, burlap, or other material. Alternatively, the backing may be used simply as a carrier during manufacture of the product. In such cases, the backing would be coated with a release layer in order that the final product may readily be stripped from the backing. As still another alternative, the materials of the product of the present invention may be laid up on a movable belt such as a steel belt, silicone belt, or other conveying substance from which the final product can be stripped at the end of the process.

The foamable plastisol is formed of conventional ingredients and will most commonly consist of poly(vinyl chloride) resins, plasticized with suitable plasticizers such as dioctyl phthalate. Stabilizers and pigments of conventional kinds and in conventional amounts will normally be present. The blowing agent will be any of the conventional blowing agents normally used to form foamable plastisols; at present the most commonly used blowing agent for systems of this kind is azodicarbonamide. Following is a general formula suitable for making the plastisol:

| Ingredients: | Parts by weight |
|---|---|
| Poly(vinyl chloride) resin | 100.0 |
| Epoxidized soya bean oil (heat stabilizer) | 5.0 |
| Lead-2-ethylhexanolate (stabilizer) | 1.9 |
| Dioctyl phthalate (plasticizer) | 48.9 |
| Azodicarbonamide, 50% in dioctyl phthalate | 5.0 |
| Titanium dioxide pigment in dioctyl phthalate, 58% | 8.26 |

These foamable plastisols are formulated in suitable mixers in a conventional manner and will have a density of about 9.5 pounds per gallon. The foamable plastisol is doctored on a suitable backing or strippable carrier to a thickness which will depend on the thickness of the final foam desired. This thickness will normally vary from about 10 mils to about 40 mils; a good working thickness runs about 20 mils. With the above-stated density in a thickness of about 20 mils, the application rate will normally be about 117.5 pounds per 100 square yards.

Gelation of the foamable plastisol should be carried out in such a manner that the blowing agent is not decomposed in any significant amount. This means that the gelation temperature of the product should be maintained below at least about 350° F. The product may be gelled at relatively low temperatures of 250° F. by holding the product in the suitable oven for a relatively long period of time. However, it is preferred, in the interest of speed and economy of operation, that the gelling operation be carried out in a relatively hot oven, say of about 400° F., in which the residence time is controlled to insure that the temperature of gelation does not go sufficiently high to begin decomposition of the blowing agent. It will be appreciated that oven lengths, temperatures, and speed of throughput can be varied to achieve gelation.

Following gelation, the surface of the gelled, foamable plastisol is printed in any convenient manner to apply to the surface a decorative printed layer. Preferably the decorative printed layer will be applied by rotogravure printing operations, although any convenient method of printing may be used. The inks to be used will be any conventional printing inks which adhere to the resinous surface of the gelled foamable plastisol sheet.

A transparent flock adhesive is applied over the printed surface in order that flock will adhere to the surface. The flock adhesive may be any of those conventionally used to adhere flock to a resinous surface. A particularly appropriate formulation for use in the flock adhesive is as follows:

| Ingredients: | Parts by weight |
|---|---|
| Poly(vinyl chloride) | 100 |
| Dioctyl phthalate (plasticizer) | 25 |
| Epoxidized soya bean oil (heat stabilizer) | 15 |
| Lead-2-ethylhexanolate (heat and light stabilizer) | 3 |
| Polyethylene glycol (diluent) | 2 |
| Toluene diisocyanate | 1 |

A good flock adhesive should produce a tack-free film in order to minimize soiling of the finished product, and this means that the plasticizer should be kept to a minimum consistent with ease of application and flexibility of film. The transparent flock adhesive may be applied over the printed surface by any convenient method such as by knife coating or by back roll coating. For the present product, it is preferred that the transparent flock adhesive be coated to the printed surface in a coat of about 6–10 mils in thickness, and preferably about 8 mils in thickness.

The flock is applied mechanically or electrostatically, preferably electrostatically, and the excess is removed by an air knife. A variety of electrostatic flockers is available. The flock to be applied may be chopped or cut flock, and the flock may be of any convenient length of up to about 5 millimeters. It is one of the advantages of the present invention that inexpensive chopped flock may be used. The flock will preferably be nylon fibers, although other synthetic fibers may be used. Preferably the flock will be light in color and, for decorative purposes, will supplement the colors used in the printed layer. Although denier of the flock is not critical, a denier of about 15 is preferred in order to minimize surface area per ounce of flock. Flock density on the product will preferably be in the range of about 1–3 ounces per square yard, with 2 ounces per square yard being the preferred amount.

Once the flock has been applied, the entire structure is heated to fuse and expand the resins of the foamable plastisol, to set the resins in the flock adhesive, and to cause adherence of the several layers with one another. This heating step is preferably carried out at a relatively high temperature such as about 500° F. for a relatively short period of time, such as about 40 seconds. In order to prevent any fusion of flock, it is preferred that the heating step be carried out in a hot air oven in which the air is impinged only against the back of the system. The fused and expanded product exits the oven with a backing temperature of 360–385° F. and a flock surface temperature of approximately 320° F. The expansion ratio, that is the thickness of the expanded foam divided by the thickness of the unfoamed gelled plastisol, can be controlled as desired for any product by varying the amount of blowing agent and will generally be in the range of 2–4, with an expansion ratio of about 3 being a good workable average for most products.

The fused and expanded product must now be mechanically embossed. This embossing cannot take place at the high temperatures existing in the product when it first comes out of the expansion oven; the embossing roll may smear the heat-softened foam and cause it to blister or bubble. Embossing is most preferably carried out at a back temperature of the product of about 220° F. and a flock surface temperature of about 190° F. The mechanical embossing roll should be relatively cool and should cause permanent depressions in the foam structure of the foamed plastisol. The depths of embossing in the foam structure will generally be in the range of 20 to 100 mils, with 60 mils being a good working average. The surface appearance of the embossing will preferably be such as to give the impression of a tufted carpet when viewed by the eye. Accordingly, the embossing roll surface should carry such configuration.

It is a surprising feature of the present invention that the printed decorative layer beneath the flock becomes visible to the eye from all directions only after the embossing step has been carried out. Even a transparent flock largely or totally obscures the printed decorative layer prior to the embossing step unless the product is viewed from a direction normal to the product surface.

After embossing, the product is ready for roll-up for subsequent inspection and distribution. The embossing step accomplishes additional cooling of the product, and roll-up may often be accomplished immediately after the embossing step. Temperatures are then in the range of about 160–170° F.

PRODUCT CHARACTERISTICS

The printed decorative layer in the product is unaffected by normal wear on the product since it is protected by both the transparent flock adhesive layer and the flock. The embossing step allows the printed decorative layer to be visible from all angles instead of being only partially visible when viewed perpendicular to the design. The final product offers the design capabilities of many hard surface floorings and the warmth and feel of low-cost carpeting combined with the durability of nylon, if the flock is of nylon.

Dimensional stability of the product is excellent both in the machine direction and in a cross-machine direction. Household stains have no more effect on the product than on similar carpet products, and in many respects this product was superior in such stain resistance. When subjected to standard abrasion tests, static load tests, and the "Tetrapod Walker" test, the product compared favorably with carpeting. In the static load test, which gives the effect of furniture rests on flooring, the product was superior.

We claim:
1. The process of making a surface covering comprising forming a gelled, foamable plastisol layer having a thickness in the range of 10 to 40 mils, printing a decorative coating on said gelled layer, applying a transparent flock adhesive to said printed, gelled layer, applying flock to the adhesive-coated printed layer, heating the flocked layer to fuse and expand the plastisol layer and set the flock adhesive, and embossing the expanded layer to render said decorative coating visible from all directions through said flock.

2. A process according to claim 1 wherein said gelled, foamable plastisol layer is applied to a permanent backing.

3. A process according to claim 1 wherein said plastisol layer comprises a poly(vinyl chloride) resin.

4. A process according to claim 1 wherein said flock comprises nylon.

5. A process according to claim 1 wherein said decorative coating is applied by rotogravure printing.

6. A surface covering comprising a cellular layer of a fused plastisol, a decorative coating on one surface of said layer, a fused transparent adhesive layer overlaying said decorative coating, a flock embedded in said adhesive layer, and embossed depressions in said cellular layer whereby said decorative layer is visible to the eye from all directions through said flock.

7. The surface covering according to claim 6 wherein said cellular plastisol comprises poly(vinyl chloride).

8. A surface covering according to claim 6 in which said flock comprises nylon.

References Cited

UNITED STATES PATENTS

| | | | |
|---|---|---|---|
| 2,714,559 | 8/1955 | Sheffield et al. | 117—9 |
| 2,784,630 | 3/1957 | Koprow et al. | 117—33X |
| 3,196,030 | 7/1965 | Petry | 161—119UX |
| 3,224,894 | 12/1965 | Palmer | 117—11 |
| 3,408,248 | 10/1968 | Maass | 117—11X |
| 3,414,928 | 12/1968 | Lemelson | 161—64X |
| 3,428,471 | 2/1969 | Tuthill et al. | 264—47X |

ALFRED L. LEAVITT, Primary Examiner

T. E. BOKAN, Assistant Examiner

U.S. Cl. X.R.

117—11, 29, 33; 161—5, 6, 64, 119; 264—47, 132